(12) United States Patent
Kajuluri et al.

(10) Patent No.: US 11,743,033 B2
(45) Date of Patent: Aug. 29, 2023

(54) TRANSMISSION OF AUTHENTICATION KEYS

(71) Applicant: Ford Global Technologies, LLC, Dearborn, MI (US)

(72) Inventors: Venkata Kishore Kajuluri, Southgate, MI (US); Xin Ye, Farmington Hills, MI (US); Bradley Warren Smith, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 17/171,388

(22) Filed: Feb. 9, 2021

(65) Prior Publication Data
US 2022/0255729 A1    Aug. 11, 2022

(51) Int. Cl.
*H04L 9/08*    (2006.01)

(52) U.S. Cl.
CPC ............ *H04L 9/083* (2013.01); *H04L 9/0894* (2013.01); *H04L 2209/84* (2013.01)

(58) Field of Classification Search
CPC .............................. H04L 9/083; H04L 9/0894
USPC ........................................................ 380/279
See application file for complete search history.

(56) References Cited

U.S. PATENT DOCUMENTS

| 10,419,220 | B2 | 9/2019 | Takemori et al. |
| 2007/0242829 | A1* | 10/2007 | Pedlow ............ H04N 21/26606 380/277 |
| 2013/0230173 | A1* | 9/2013 | Hori ...................... G08G 1/092 380/279 |
| 2019/0261177 | A1 | 8/2019 | Yamazaki et al. |
| 2020/0034835 | A1* | 1/2020 | Kim ................... G06Q 20/3274 |
| 2022/0232009 | A1* | 7/2022 | Gordon ................. H04L 63/062 |

FOREIGN PATENT DOCUMENTS

EP    3148152 A1    3/2017

* cited by examiner

*Primary Examiner* — Kambiz Zand
*Assistant Examiner* — Phuc Pham
(74) *Attorney, Agent, or Firm* — Brandon Hicks; Bejin Bieneman PLC

(57) ABSTRACT

A system for a vehicle includes a computer, a first electronic control module, and a wired vehicle communications network coupling the computer and the first electronic control module. The computer is programmed to transmit authentication keys to the first electronic control module and a plurality of second electronic control modules via the wired vehicle communications network, encrypt a table of the authentication keys using a first key, store the encrypted table, transmit the encrypted table to the first electronic control module via the wired vehicle communications network, and transmit the encrypted table and the first key to a remote server spaced from the wired vehicle communications network.

14 Claims, 4 Drawing Sheets

TRANSMISSION OF AUTHENTICATION KEYS

BACKGROUND

Symmetric-key algorithms are cryptographic algorithms using a same cryptographic key for encrypting unencrypted data and for decrypting encrypted data. Symmetric-key algorithms can use stream ciphers or block ciphers. Stream ciphers encrypt characters of a message one by one. Block ciphers encrypt a block of bits while padding the plaintext. An example of block ciphering is the Advanced Encryption Standard algorithm promulgated by the National Institute of Standards and Technology.

DETAILED DESCRIPTION

Figure 1:
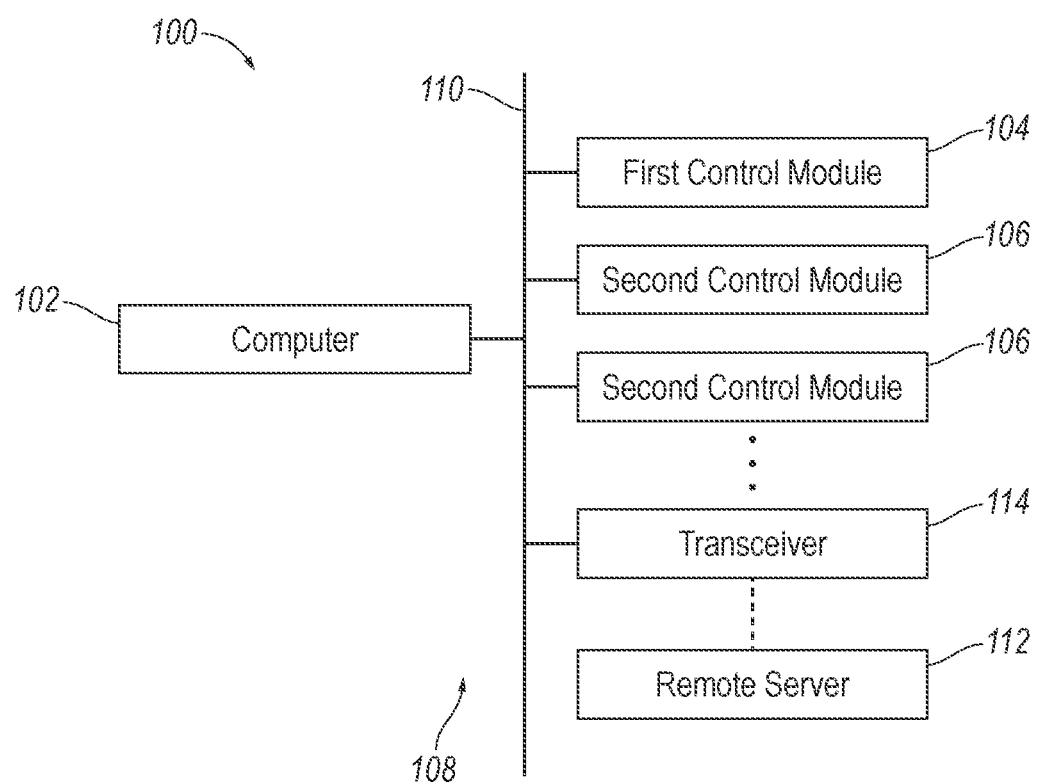
FIG. 1 is a block diagram of an example vehicle.

A system includes a computer, a first electronic control module, and a wired vehicle communications network coupling the computer and the first electronic control module. The computer is programmed to transmit authentication keys to the first electronic control module and a plurality of second electronic control modules via the wired vehicle communications network, encrypt a table of the authentication keys using a first key, store the encrypted table, transmit the encrypted table to the first electronic control module via the wired vehicle communications network, and transmit the encrypted table and the first key to a remote server spaced from the wired vehicle communications network.

The first electronic control module may lack the first key.

The computer may be further programmed to request a second encrypted table from the first electronic control module, the second encrypted table may be encrypted using a second key, and the computer may lack the second key. The computer may be further programmed to transmit the second encrypted table to the remote server; receive a third encrypted table from the remote server, the third encrypted table being the second encrypted table decrypted using the second key and encrypted using the first key; and decrypt the third encrypted table using the first key. The computer may be further programmed to transmit new authentication keys to the first electronic control module and the second electronic control modules using old authentication keys from the decrypted third encrypted table.

The computer may be storing the first key.

A computer includes a processor and a memory storing instructions executable by the processor to transmit authentication keys to a first electronic control module and a plurality of second electronic control modules on board a vehicle via a wired vehicle communications network, encrypt a table of the authentication keys using a first key, store the encrypted table, transmit the encrypted table to the first electronic control module, and transmit the encrypted table and the first key to a remote server spaced from the wired vehicle communications network.

The instructions may not include instructions to transmit the first key to the first electronic control module. The instructions may include instructions to request a second encrypted table from the first electronic control module, and the second encrypted table may be encrypted using a second key. The instructions may include instructions to transmit the second encrypted table to the remote server; receive a third encrypted table from the remote server, the third encrypted table being the second encrypted table decrypted using the second key and encrypted using the first key; and decrypt the third encrypted table using the first key. The instructions may include instructions to transmit new authentication keys to the first electronic control module and the second electronic control modules using old authentication keys from the decrypted third encrypted table.

The memory may be storing the first key.

The memory may lack the second key.

A method includes transmitting authentication keys from a computer to a first electronic control module and a plurality of second electronic control modules on board a vehicle via a wired vehicle communications network, encrypting a table of the authentication keys using a first key by the computer, storing the encrypted table by the computer, transmitting the encrypted table from the computer to the first electronic control module, and transmitting the encrypted table and the first key from the computer to a remote server spaced from the wired vehicle communications network.

The first electronic control module may lack the first key.

The method may further include requesting the encrypted table from the first electronic control module by a replacement computer replacing the computer, and the replacement computer may lack the first key. The method may further include transmitting the encrypted table from the replacement computer to the remote server; then receiving a re-encrypted table from the remote server by the replacement computer, the re-encrypted table being the table encrypted by a second key; and decrypting the re-encrypted table using the second key by the replacement computer. The method may further include transmitting new authentication keys from the replacement computer to the first electronic control module and the second electronic control modules using the authentication keys from the decrypted re-encrypted table.

The replacement computer may be storing the second key before receiving the re-encrypted table.

The method may further include receiving the encrypted table from the replacement computer by the remote server, decrypting the encrypted table by the remote server, identifying the second key based on an identity of the replacement electronic control module by the remote server, encrypting the decrypted table using the second key to create the re-encrypted table by the remote server, and transmitting the re-encrypted table from the remote server to the replacement computer.

With reference to the Figures, a vehicle 100 includes a computer 102 and a plurality of electronic control modules 104, 106. Communications between the computer 102 and the electronic control modules 104, 106 and among the electronic control modules 104, 106 are encrypted, e.g., using a symmetric-key algorithm. In a communication in which there is a sender and a receiver from the computer 102 and/or the electronic control modules 104, 106, the sender and the receiver both have the same authentication key stored, which the sender uses to encrypt the communication and the receiver uses to decrypt the communication, which can prevent the contents of the communication being known if the communication is intercepted.

However, if a third party discovers the authentication key, then the third party would be able to understand the contents of an intercepted communication. Thus, distributing the authentication keys must be done in a secure manner. An initial distribution of authentication keys can be performed at the time that the vehicle 100 is manufactured. Subsequently, situations can arise warranting a distribution of new authentication keys, e.g., one of the electronic control modules 104, 106 is replaced, meaning that the new electronic control module does not have the same authentication key as the computer 102 and cannot exchange encrypted communications with the computer 102 (and/or the other electronic control modules 104, 106); or the computer 102 is replaced, meaning that the computer 102 does not have the same authentication keys as the electronic control modules 104, 106.

A system 108 for the vehicle 100 includes the computer 102, the first electronic control module 104, and a wired vehicle communications network 110 coupling the computer 102 and the first electronic control module 104. The computer 102 is programmed to transmit authentication keys to the first electronic control module 104 and a plurality of second electronic control modules 106 via the wired vehicle communications network 110, encrypt a table of the authentication keys using a first key, store the encrypted table, transmit the encrypted table to the first electronic control module 104 via the wired vehicle communications network 110, and transmit the encrypted table and the first key to a remote server 112 spaced from the wired vehicle communications network 110.

Distribution and deployment of authentication keys as disclosed herein improves the provision of vehicle network security, specifically upon replacement of the computer 102 or one of the electronic control modules 104, 106. For example, if a replacement computer 102 replaces an old computer 102, the replacement computer 102 can acquire the encrypted table from the first electronic control module 104 and communicate with the remote server 112 to have the remote server 112 decrypt the encrypted table and re-encrypt the table using the first key, i.e., the key available on the replacement computer 102. The replacement computer 102 can then distribute new authentication keys using the current authentication keys. This is preferable to the remote server 112 sending the master keys of the electronic control modules 104, 106. A master key is a key that can be permanently used to encrypt communications with an electronic control module, even if the authentication key is updated. Not transmitting the master keys keeps the electronic control modules 104, 106 more secure. Moreover, the encrypted key table is stored in two locations, the first electronic control module 104 and the remote server 112, providing redundancy in case one copy of the encrypted key table is corrupted.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided.

The computer 102 may transmit and receive data through the wired vehicle communications network 110 such as a controller area network (CAN) bus, Ethernet, Local Interconnect Network (LIN), onboard diagnostics connector (OBD-II), any other type of wired network, or a combination of different types of wired networks. The computer 102 may be communicatively coupled to the electronic control modules 104, 106, a transceiver 114, and other components via the wired vehicle communications network 110.

The electronic control modules 104, 106 are microprocessor-based computing devices, e.g., generic computing devices each including a processor and a memory, electronic controllers or the like, field-programmable gate arrays (FPGA), application-specific integrated circuits (ASIC), etc. Each electronic control module 104, 106 can thus include a processor, a memory, etc. The memory of each electronic control module 104, 106 can include media for storing instructions executable by the processor as well as for electronically storing data and/or databases, and/or each electronic control module 104, 106 can include structures such as the foregoing by which programming is provided. The electronic control modules 104, 106 can operate different systems in the vehicle 100, e.g., a body control module, a powertrain control module, a restraint control module, etc.

The transceiver 114 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 114 may be adapted to communicate with a remote server 112, that is, a server distinct and spaced from the vehicle 100. The remote server 112 may be located outside the vehicle 100. For example, the remote server 112 may be associated with another vehicle (e.g., V2V communications), an infrastructure component (e.g., V2I communications), an emergency responder, a mobile device associated with the owner of the vehicle 100, etc. The transceiver 114 may be one device or may include a separate transmitter and receiver.

In particular, the remote server 112 can be a server dedicated to servicing vehicles 100 such as the vehicle 100. The remote server 112 is remote, i.e., spaced, from the wired vehicle communications network 110. The remote server 112 can store encrypted key tables for a plurality of the vehicles 100, as described below.

Figure 2:
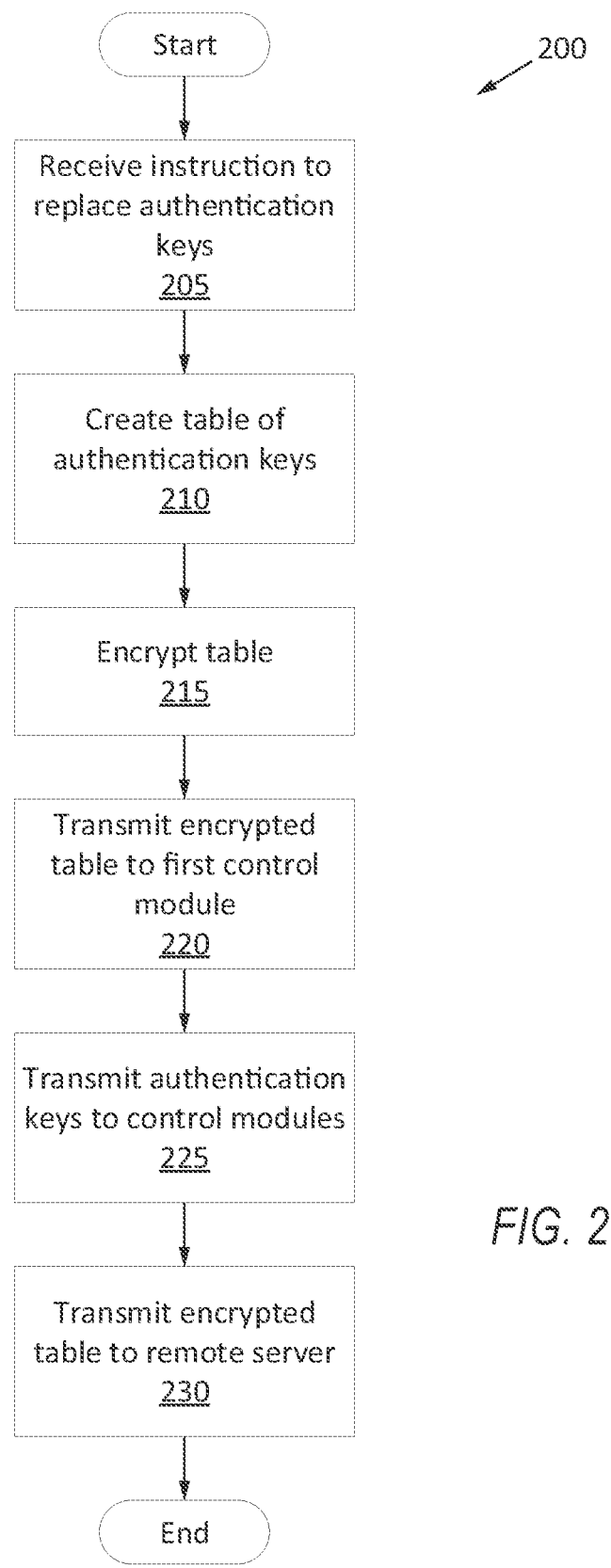
FIG. 2 is a process flow diagram of an example process for distributing authentication keys from a computer to electronic control modules of the vehicle.

FIG. 2 is a process flow diagram illustrating an exemplary process 200 for distributing the authentication keys from the computer 102 to the electronic control modules 104, 106. The memory of the computer 102 stores executable instructions for performing the steps of the process 200 and/or programming can be implemented in structures such as mentioned above. As a general overview of the process 200, the computer 102 receives an instruction to replace the authentication keys, creates a table of the authentication keys, encrypts the table using a first key, transmits the encrypted table to the first electronic control module 104, transmits the authentication keys to the electronic control modules 104, 106, and transmits the encrypted table and the first key to the remote server 112.

The process 200 begins in a block 205, in which the computer 102 receives an instruction to replace the authentication keys, i.e., distribute new authentication keys that supersede the existing, i.e., old, authentication keys that the electronic control modules 104, 106 are currently using (if any). For example, the computer 102 can receive an authorization message granting permission to distribute the authentication keys. The authorization message may have an expiration time. The instruction can be provided to the computer 102 by a technician or the remote server 112 via the transceiver 114.

Next, in a block 210, the computer 102 generates the table of new authentication keys. The computer 102 can use any suitable method for generating the new authentication keys, e.g., a pseudorandom key generator, as is known. The computer 102 creates the table by pairing the new authentication keys with the respective electronic control modules 104, 106.

Next, in a block 215, the computer 102 encrypts the table using the first key, which is stored on the computer 102 for encryption purposes. The encryption converts the table from plaintext to ciphertext. The computer 102 then stores the encrypted table in memory.

Next, in a block 220, the computer 102 transmits the encrypted table from the computer 102 to the first electronic control module 104 via the wired vehicle communications network 110. The computer 102 does not transmit the first key to the first electronic control module 104, and the first electronic control module 104 lacks the first key. The first electronic control module 104 is therefore incapable of decrypting the encrypted table. This helps protect the integrity of the encrypted table.

Next, in a block 225, the computer 102 transmits the new authentication keys from the computer 102 to the respective first electronic control module 104 and second electronic control modules 106 via the wired vehicle communications network 110. If an old set of authentication keys had been in use, the computer 102 encrypts the new authentication keys using the old authentication keys in order to transmit the new authentication keys to the respective first electronic control module 104 and second electronic control modules 106. For an initial distribution of authentication keys to the electronic control modules 104, 106 (typically performed at an assembly plant), the computer 102 may send the new authentication keys unencrypted.

Next, in a block 230, the computer 102 transmits the encrypted table and the first key to the remote server 112 via the transceiver 114. The first key may be encrypted, e.g., by a remote-server public key, permitting the remote server 112 to decrypt the first key with a remote-server private key known only to the remote server 112. The encrypted table may also be encrypted by the remote-server public key. After the block 230, the process 200 ends.

Figure 3:
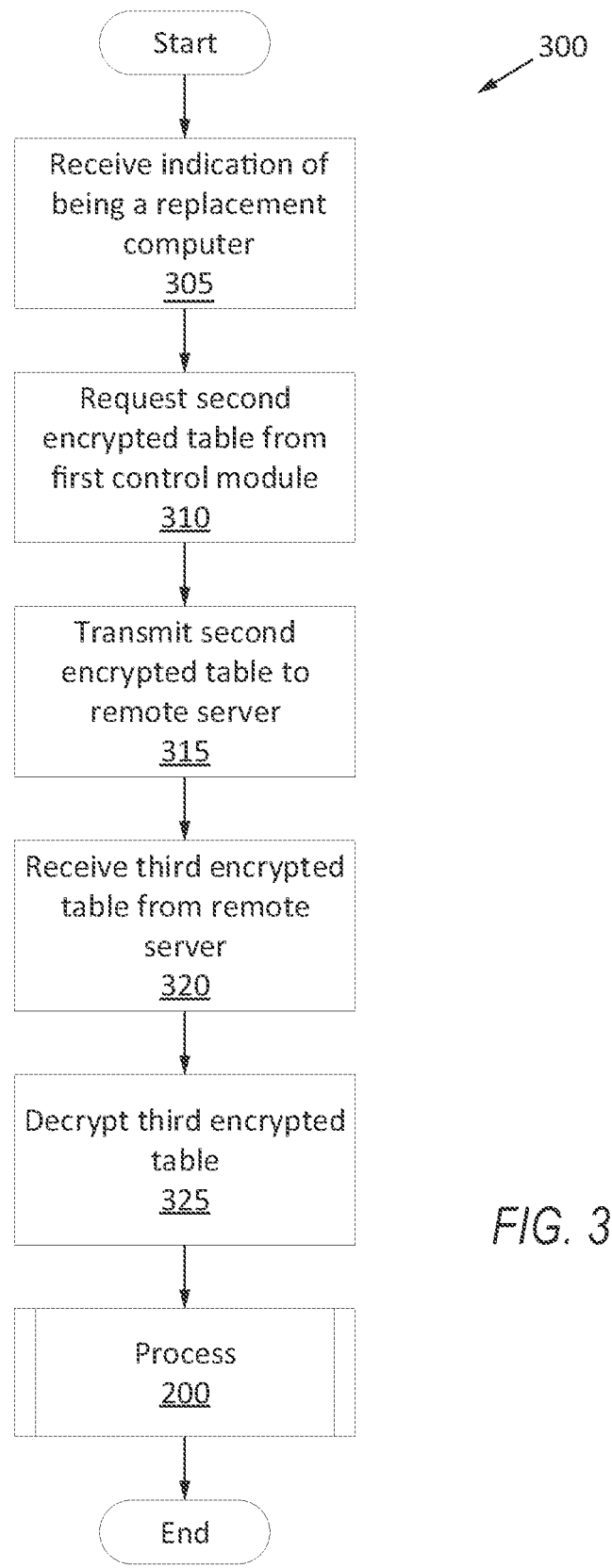
FIG. 3 is a process flow diagram of an example process for updating the authentication keys after replacing the computer in the vehicle.

FIG. 3 is a process flow diagram illustrating an exemplary process 300 for updating the authentication keys after replacing the computer 102 in the vehicle 100. The memory of the computer 102 stores executable instructions for performing the steps of the process 300 and/or programming can be implemented in structures such as mentioned above.

Regardless of whether the replacement computer 102 is used or new, the replacement computer 102 does not have access to the authentication keys in use by the electronic control modules 104, 106 when installed. If the replacement computer 102 is used, then the replacement computer 102 has previously interacted with a different first electronic control module 104 and different second electronic control modules 106 in a different vehicle 100. The authentication keys that the replacement computer 102 had been using are not in use in the new vehicle 100, and the encrypted table stored on the replacement computer 102 is thus inapplicable. If the replacement computer 102 is new, then the replacement computer 102 does not have an encrypted table stored.

As a general overview of the process 300, the computer 102 receives an indication that the computer 102 is a replacement, requests a second encrypted table from the first electronic control module 104, transmits the second encrypted table to the remote server 112, receives a third encrypted table from the remote server 112, decrypts the third encrypted table, and uses the old authentication keys from the decrypted third encrypted table to perform the process 200 for distributing the new authentication keys. As described below with respect to a process 400, the second encrypted table is decrypted and re-encrypted by the remote server 112 using the first key and then sent to the replacement computer 102 as the third encrypted table. The second and third encrypted tables contain the same authentication keys, but the third encrypted table is decryptable by the replacement computer 102 whereas the second encrypted table is not.

The process 300 begins in a block 305, in which the computer 102 receives an indication that it is a replacement computer 102. For example, the replacement computer 102 can receive a message from a technician performing the replacement via the transceiver 114. For another example, the replacement computer 102 can transmit messages to the electronic control modules 104, 106 and not receive acknowledgments or receive notifications that the messages were undecipherable.

Next, in a block 310, the replacement computer 102 requests the second encrypted table from the first electronic control module 104. The second encrypted table was transmitted by the pre-replacement computer 102 to the first electronic control module 104, as described above with respect to the block 220. From the perspective of the replacement computer 102 that performed the process 200 in a different vehicle 100, the second encrypted table is called "second" because the replacement computer 102 is storing the (first) encrypted table of the authentication keys used in the different vehicle 100. From the perspective of the first electronic control module 104 and the rest of the vehicle 100 besides the replacement computer 102, the second encrypted table is simply the encrypted table described in the process 200. The second encrypted table was encrypted using a second key before being stored on the first electronic control module 104, as described above with respect to a block 215. From the perspective of the pre-replacement computer 102, the second key is the first key as described above with respect to the process 200. The second key is stored on the pre-replacement computer 102 that has been removed from the vehicle 100, but the memory of the replacement computer 102 lacks the second key.

Next, in a block 315, the replacement computer 102 transmits the second encrypted table to the remote server 112 via the transceiver 114. As described below with respect to the process 400, the remote server 112 has access to the second key for decrypting the second table.

Next, in a block 320, the replacement computer 102 receives the third encrypted table from the remote server 112 via the transceiver 114. As described below with respect to the process 400, the remote server 112 created the third encrypted table by decrypting the second encrypted table using the second key and encrypting the decrypted second encrypted table using the first key.

Next, in a block 325, the replacement computer 102 decrypts the third encrypted table using the first key. The replacement computer 102 is storing the first key in memory, and the first encrypted table was encrypted using the first key.

Next, the replacement computer 102 transmits new authentication keys to the electronic control modules 104, 106 using the old authentication keys from the decrypted third encrypted table, following the process 200 described above. Performing the blocks 305-325 serves as the instruction to replace the authentication keys for purposes of the block 205. The old authentication keys from the decrypted third encrypted table are used by the replacement computer 102 in the block 225 when distributing the new authentication keys. After the replacement computer 102 performs the process 200, the process 300 ends.

Figure 4:
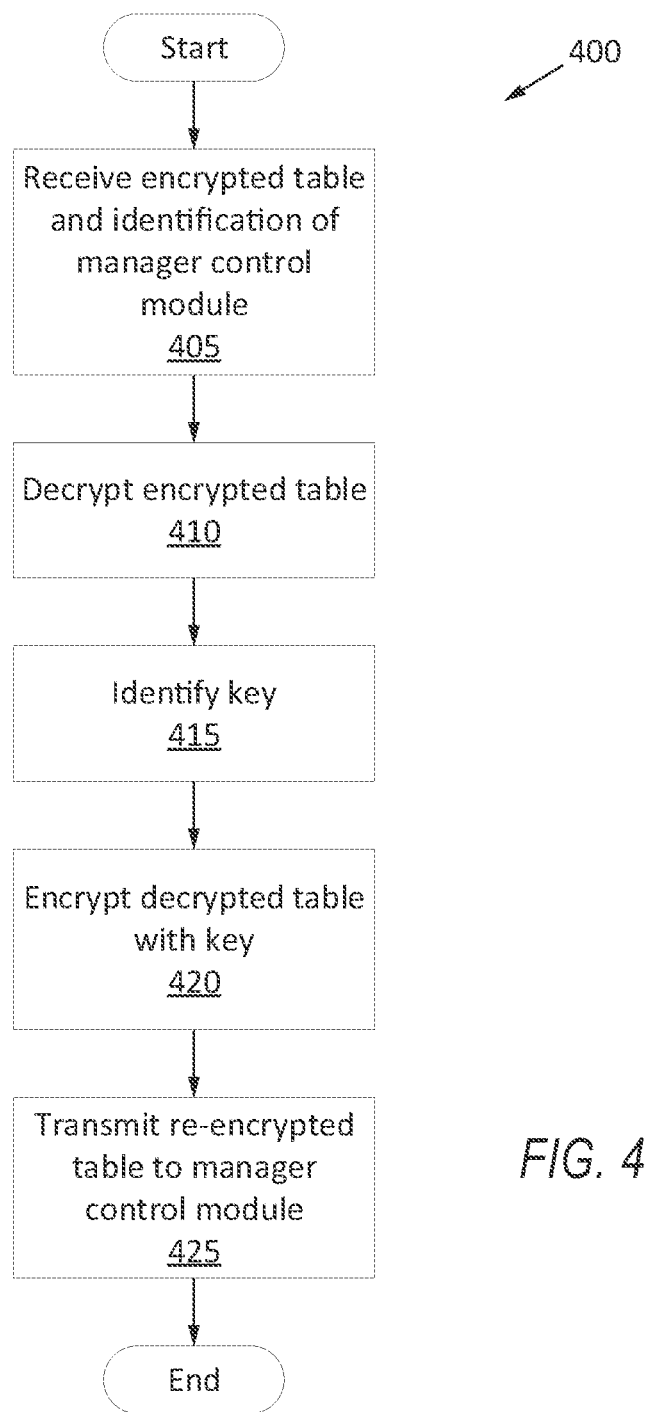
FIG. 4 is a process flow diagram of a remote server assisting replacement of the computer in the vehicle.

FIG. 4 is a process flow diagram illustrating an exemplary process 400 for assisting replacement of the computer 102 in the vehicle 100 by the remote server 112. The memory of the remote server 112 stores executable instructions for performing the steps of the process 400 and/or programming can be implemented in structures such as mentioned above. As a general overview of the process 400, the remote server 112 receives an encrypted table (the second encrypted table from the perspective of the replacement computer 102) from the replacement computer 102, decrypts the encrypted table, identifies the key stored on the replacement computer 102 (the first key from the perspective of the replacement computer 102 and the second key from the perspective of the rest of the vehicle 100), encrypts the decrypted table using the key, and transmits the re-encrypted table (the third encrypted table from the perspective of the replacement computer 102) to the replacement computer 102.

The process 400 begins in a block 405, in which the remote server 112 receives the encrypted table from the replacement computer 102, along with identifying information for the replacement computer 102. The identifying information can be, e.g., a serial number of the replacement computer 102 or the key of the replacement computer 102. The identifying information can be encrypted using a public key of the remote server 112, in which case the remote server 112 decrypts the identifying information using the remote-server private key.

Next, in a block 410, the remote server 112 decrypts the encrypted table using the key of the pre-replacement computer 102. Identifying information for the pre-replacement computer 102 can be transmitted to the remote server 112, e.g., by a technician performing the replacement.

Next, in a block 415, the remote server 112 identifies the key of the replacement computer 102 based on the identifying information provided in the block 405. The remote server 112 can have the keys stored paired with the identifying information of a plurality of the computers 102.

Next, in a block 420, the remote server 112 encrypts the decrypted table using the key of the replacement computer 102, i.e., the first key from the perspective of the replacement computer 102 and the second key from the perspective of the rest of the vehicle 100.

Next, in a block 425, the remote server 112 transmits the re-encrypted table to the replacement computer 102. The replacement computer 102 is now able to decrypt the re-encrypted table (the third encrypted table from the perspective of the replacement computer 102). After the block 425, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first," "second," and "third" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
   a computer;
   a first electronic control module; and
   a wired vehicle communications network coupling the computer and the first electronic control module;
   the computer being programmed to:
   transmit authentication keys to the first electronic control module and a plurality of second electronic control modules via the wired vehicle communications network;
   encrypt a table of the authentication keys using a first key;
   store the encrypted table;
   transmit the encrypted table to the first electronic control module via the wired vehicle communications network;
   transmit the encrypted table and the first key to a remote server spaced from the wired vehicle communications network;
   request a second encrypted table from the first electronic control module, the second encrypted table being encrypted using a second key, the computer lacking the second key;
   transmit the second encrypted table to the remote server;
   receive a third encrypted table from the remote server, the third encrypted table being the second encrypted table decrypted using the second key and encrypted using the first key; and
   decrypt the third encrypted table using the first key.

2. The system of claim 1, wherein the first electronic control module lacks the first key.

3. The system of claim 1, wherein the computer is further programmed to transmit new authentication keys to the first electronic control module and the second electronic control modules using old authentication keys from the decrypted third encrypted table.

4. The system of claim 1, wherein the computer is storing the first key.

5. A computer comprising a processor and a memory storing instructions executable by the processor to:
   transmit authentication keys to a first electronic control module and a plurality of second electronic control modules on board a vehicle via a wired vehicle communications network;
   encrypt a table of the authentication keys using a first key;
   store the encrypted table;
   transmit the encrypted table to the first electronic control module;
   transmit the encrypted table and the first key to a remote server spaced from the wired vehicle communications network;
   request a second encrypted table from the first electronic control module, the second encrypted table being encrypted using a second key, the computer lacking the second key;
   transmit the second encrypted table to the remote server;
   receive a third encrypted table from the remote server, the third encrypted table being the second encrypted table decrypted using the second key and encrypted using the first key; and
   decrypt the third encrypted table using the first key.

6. The computer of claim 5, wherein the instructions do not include instructions to transmit the first key to the first electronic control module.

7. The computer of claim 5, wherein the instructions include instructions to transmit new authentication keys to the first electronic control module and the second electronic control modules using old authentication keys from the decrypted third encrypted table.

8. The computer of claim 5, wherein the memory is storing the first key.

9. The computer of claim 5, wherein the memory lacks the second key.

10. A method comprising:
    transmitting authentication keys from a computer to a first electronic control module and a plurality of second electronic control modules on board a vehicle via a wired vehicle communications network;
    encrypting a table of the authentication keys using a first key by the computer;
    storing the encrypted table by the computer;

transmitting the encrypted table from the computer to the first electronic control module;

transmitting the encrypted table and the first key from the computer to a remote server spaced from the wired vehicle communications network;

requesting the encrypted table from the first electronic control module by a replacement computer replacing the computer, wherein the replacement computer lacks the first key;

transmitting the encrypted table from the replacement computer to the remote server;

then receiving a re-encrypted table from the remote server by the replacement computer, the re-encrypted table being the table encrypted by a second key; and decrypting the re-encrypted table using the second key by the replacement computer.

11. The method of claim 10, wherein the first electronic control module lacks the first key.

12. The method of claim 10, further comprising transmitting new authentication keys from the replacement computer to the first electronic control module and the second electronic control modules using the authentication keys from the decrypted re-encrypted table.

13. The method of claim 10, wherein the replacement computer is storing the second key before receiving the re-encrypted table.

14. The method of claim 10, further comprising:

receiving the encrypted table from the replacement computer by the remote server;

decrypting the encrypted table by the remote server;

identifying the second key based on an identity of the replacement electronic control module by the remote server;

encrypting the decrypted table using the second key to create the re-encrypted table by the remote server; and transmitting the re-encrypted table from the remote server to the replacement computer.

* * * * *